Dec. 31, 1963     C. E. McMANAMA     3,115,909
BAND-SAW MACHINE
Filed May 4, 1960     3 Sheets-Sheet 1
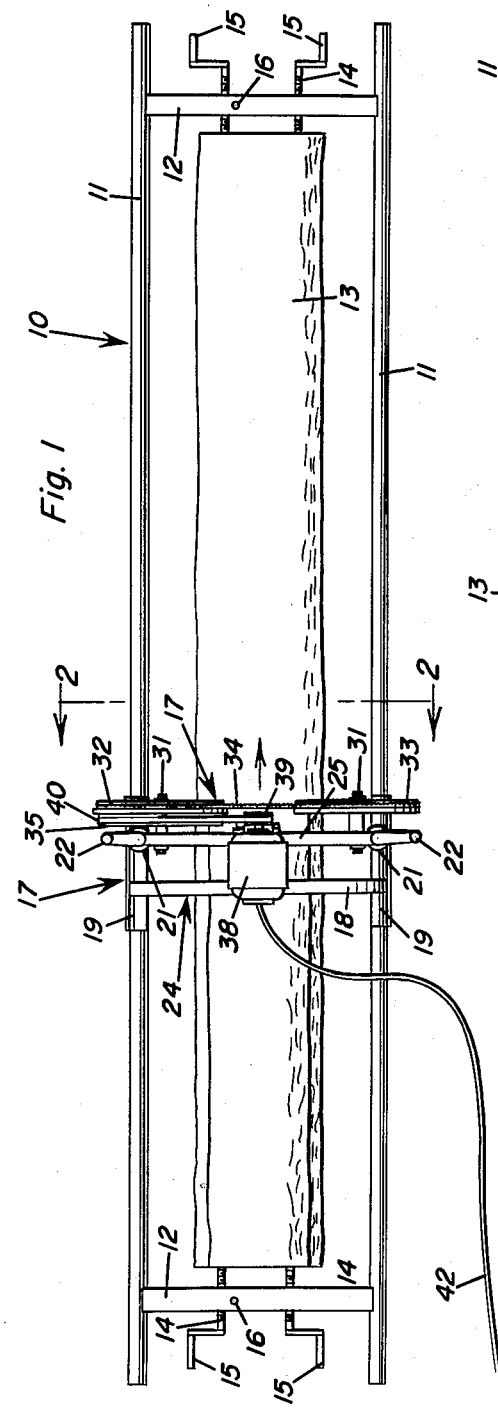
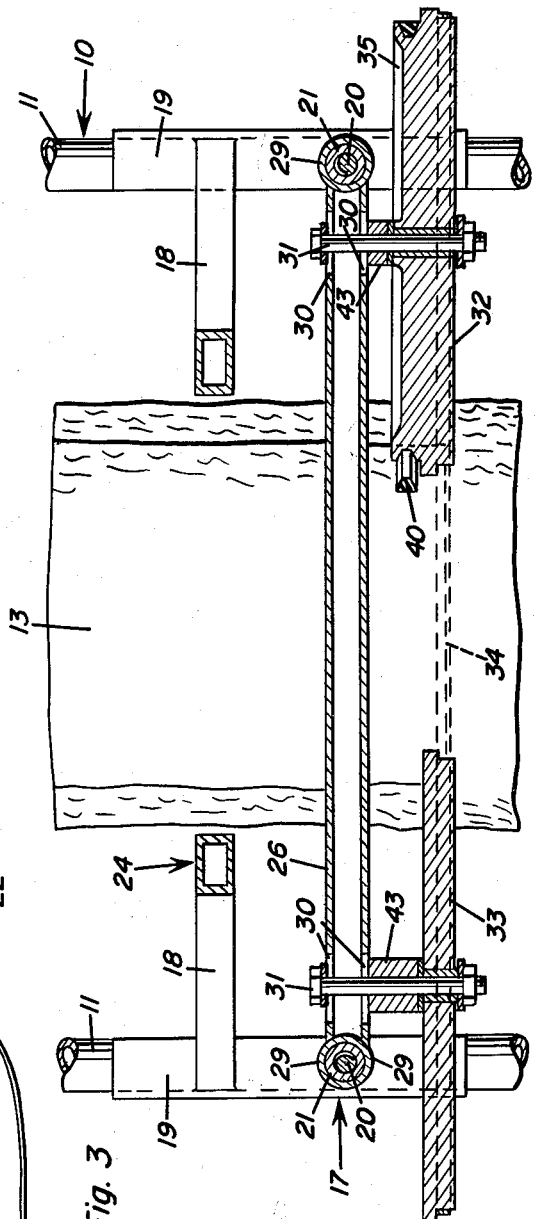
Charles E. McManama
INVENTOR.

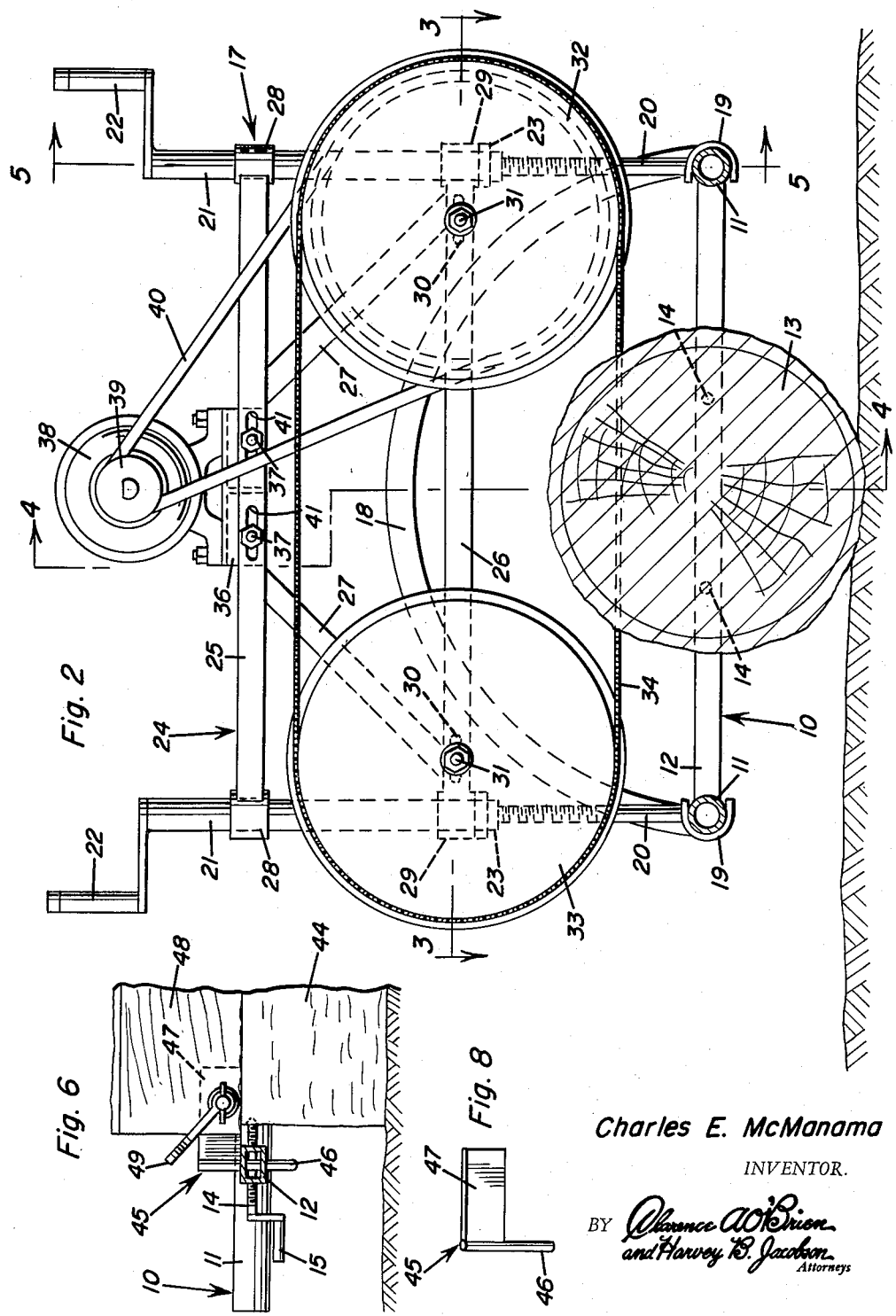

Dec. 31, 1963 C. E. McMANAMA 3,115,909
BAND-SAW MACHINE
Filed May 4, 1960 3 Sheets-Sheet 3
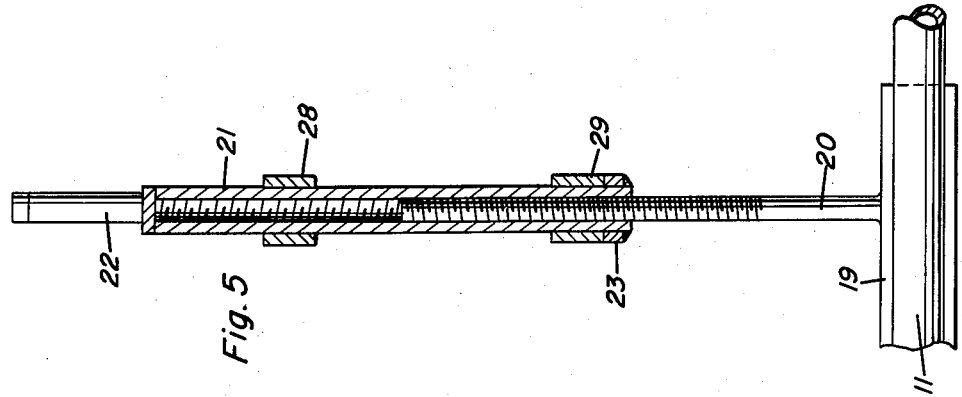
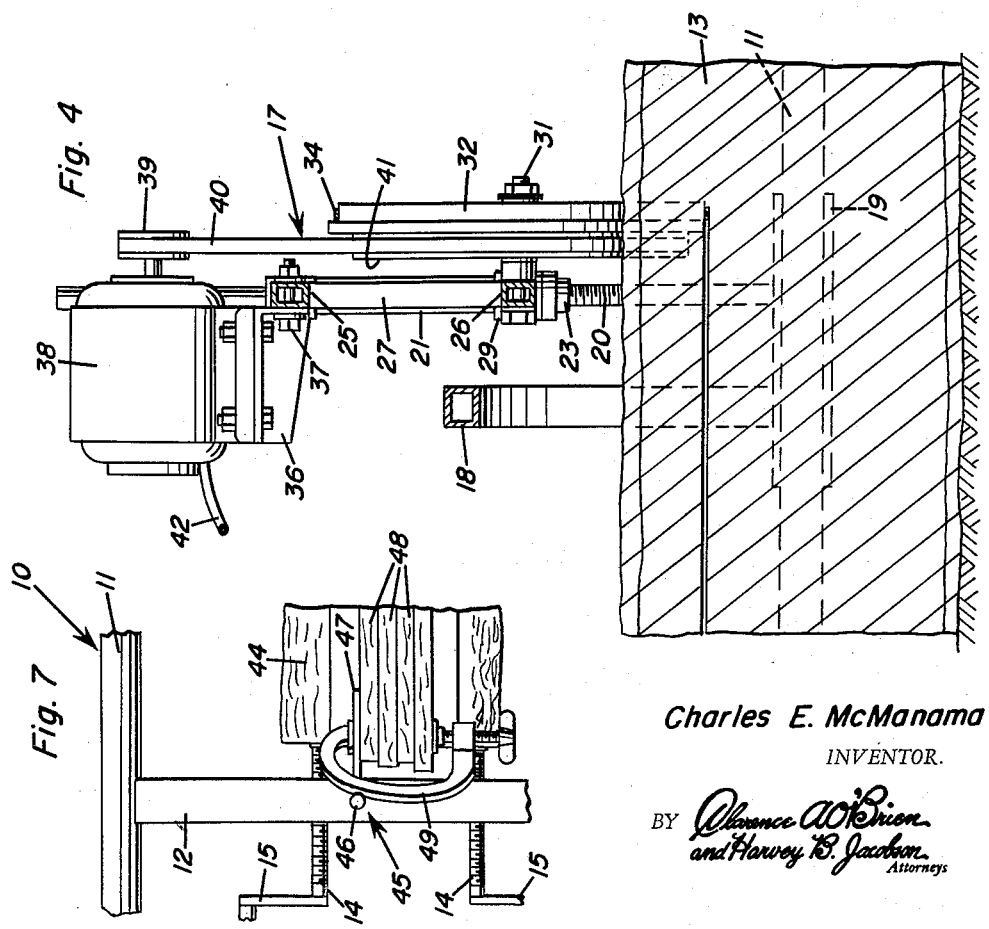
Charles E. McManama
INVENTOR.

United States Patent Office 3,115,909
Patented Dec. 31, 1963

3,115,909
BAND-SAW MACHINE
Charles E. McManama, Rte. 1, Potlatch, Idaho
Filed May 4, 1960, Ser. No. 26,877
6 Claims. (Cl. 143—19)

This invention relates to new and useful improvements in band-saw machinese and has for one of its important objects to provide, in a manner as hereinafter set forth, a device of this character which is adapted to saw into lumber fallen logs of various sizes wherever they may lie on the ground.

Another important object of the present invention is to provide a band-saw machine of the character described which may be carried from place to place with a minimum of effort.

Still another important object of the invention is to provide a portable band-saw machine of the aforementioned character which is adapted to be expeditiously secured for operation on the log or other material to be sawed.

Another important object of this invention is to provide a portable machine of the character set forth which may readily be adjusted to saw lumber of various thicknesses.

Another object of the invention is to provide a portable band-saw machine comprising a horizontally traveling saw, on which machine the lumber may be conveniently edged after it has been sawed.

Other objects of the invention are to provide a portable band-saw machine or sawmill which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view, showing a portable band-saw machine embodying the present invention in operation on a log;

FIGURE 2 is a view in transverse section on an enlarged scale, taken substantially on the line 2—2 of FIGURE 1;

FIGURE 3 is a fragmentary view in horizontal section on an enlarged scale through an intermediate portion of the machine, taken substantially on the line 3—3 of FIGURE 2;

FIGURE 4 is a fragmentary view in vertical longitudinal section through an intermediate portion of the machine, taken substantially on the line 4—4 of FIGURE 2;

FIGURE 5 is an enlarged view in vertical section through one of the vertically adjustable band-saw supports, taken substantially on the line 5—5 of FIGURE 2;

FIGURE 6 is a view principally in side elevation of one end portion of the machine, showing the means for securing the lumber in position to be edged;

FIGURE 7 is a top plan view of the portion of the machine shown in FIGURE 6; and FIGURE 8 is a detail view in perspective of one of the brackets to which the lumber to be edged is clamped.

Referring now in detail to the drawings, it will be seen that the embodiment of the invention which has been illustrated comprises an elongated, generally rectangular, horizontal frame or base of suitable metal which is designated generally by reference character 10. The base 10 includes tubular side members or rails 11 of circular cross section between the end portions of which cross bars or members 12 extend. The base 10 is adapted to be mounted on the log 13 to be sawed in a manner to enclose said log. Toward this end, longitudinal setscrews 14 are threaded through the cross bars 12 for engagement in the end portions of the log 13. The screws 14 are provided with operating cranks or handles 15. At an intermediate point the cross bars 12 are provided with vertical openings 16 the purpose of which will be presently set forth.

Mounted for longitudinal sliding movement on the base 10 is a manually actuated band-saw carriage 17. The carriage 17 comprises an upwardly arched tubular metallic bar 18 having fixed on its end portions shoes 19 of generally U-shaped cross section which are operable on the rails 11. Fixed on the shoes 19, forwardly of the bar 18, is a pair of upstanding threaded posts 20 of suitable metal. Metallic sleeves 21 are threadedly mounted for vertical adjustment on the posts 20. Operating handles or cranks 22 are fixed on the upper end portions of the sleeves 21. Fixed on the lower end portions of the sleeves 21 are flanges or collars 23 the purpose of which will also be presently set forth.

Mounted on the sleeves 21 for vertical adjustment therewith is a frame 24 of suitable metal. The frame 24 includes tubular, horizontal, transversely extending upper and lower bars 25 and 26, respectively. The bars 25 and 26 are parallel and extending therebetween are upwardly convergent tubular braces 27. The members 18, 25, 26 and 27 are of rectangular cross section. The ends of the bars 25 and 26 have fixed thereon, respectively, vertically aligned bearings 28 and 29 in which the sleeves 21 are journaled. The lower bearings 29 rest on the collars 23 for supporting the frame 24 on the sleeves 21.

As shown to advantage in FIGURE 3 of the drawings, the end portions of the bar 26 have formed therein horizontal slots 30. Horizontal spindles 31 are secured for adjustment in the slots 30. Pulleys 32 and 33 are journaled on the spindles 31. A band-saw blade 34 is trained over the pulleys 32 and 33. Formed integrally with the band-saw pulley 32 is a belt pulley 35.

A bracket 36 is secured by bolts 37 on the bar 25. Mounted on the bracket 36 is an electric motor 38. The motor 38 has mounted theron a pulley 39. A belt 40 is trained over the pulleys 39 and 35 for driving the blade 34. Slots 41 in the bar 25 receive the bolts 37 and permit sliding adjustment of the bracket 36 for regulating the tension of the belt 40. Of course, the slots 30 permit adjustment of the pulleys 32 and 33 for regulating the tension of the blade 34.

It is thought that the operation of the machine as thus far described will be readily apparent from a consideration of the foregoing. Briefly, with the band-saw carriage 17 mounted on one end portion o fthe frame or base 10 or removed therefrom, said base is positioned longitudinally on the log 13 and secured by the screws 14. The motor 38 is then connected to a suitable source of current. Toward this end, a conductor cord 42 is provided. Through the medium of the sleeves 21 threadedly mounted on the posts 20, the frame 24 is then adjusted vertically to the desired position. The motor 38 is then energized for driving the blade 34. The carriage 17 is then moved manually on the base 10 for feeding the blade 34 to the work. When the cut has been completed, the frame 24 with the blade 34 thereon is adjusted downwardly preparatory to making the next cut. Spacers 43 are provided on the spindles 31 between the bar 26 and the pulleys 32 and 33. To adjust the tension of the blade 34 either or both of the spindles 31 are shifted in the slots 30. The bracket 36 with the electric motor 38 thereon is shifted laterally on the bar 25 for adjusting the belt 40.

To edge the boards after they have been cut, a segmental log 44 with its flat side uppermost is utilized as a table on which the base or frame 10 is secured. Brackets or the like 45 are removably mounted on the cross bars 12 of the base 10. The brackets 45 include vertical shafts or stems 46 which are engaged in the openings 16.

Fixed on the shafts 46 are plates 47. Any desired number of the unedged boards, as indicated at 48, are then mounted edgewise on the log or table 44 with the plates 47 engaged longitudinally with one side thereof. The boards 48 are then secured to the supporting brackets 45 through the medium of conventional C-clamps 49 having one end engaged with the plates 47 and their other ends engaged with the boards. Thus, the boards 48 are firmly secured in position to be edged. The carriage 17 is then moved longitudinally over the boards 48 and the uppermost edges thereof are removed by the blade 34 in an obvious manner. The boards 48 are then inverted to dispose the other edges thereof uppermost. The edging operation is then repeated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable sawmill comprising: a base including a pair of spaced, parallel rails for receiving a log therebetween, means for securing said base on the log, a carriage slidable longitudinally on the rails and bridging the log, a band-saw on the carriage engageable with the log, means on the carriage for actuating said band-saw, clamping means mounted on the base, said clamping means adapted to clamp and support boards in a position generally parallel to said log and in alignment with said saw whereby the saw may be moved along said boards for edging same.

2. A portable sawmill comprising: a generally rectangular base to be mounted longitudinally on a log to be sawed into boards, said base including a pair of spaced rails paralleling the log on opposite sides thereof and further including transverse bars extending between the end portions of said rails, longitudinally adjustable screw means on said bars engageable with the ends of the log for securing the base thereon, a band-saw operable on the rails and engageable with the log for sawing the same into boards, and means on the base for securing boards on the log with the edges thereof uppermost to be removed by said band-saw.

3. A portable band-saw machine comprising an elongated, generally rectangular base for mounting longitudinal on a log to be sawed into boards, said base including a pair of spaced rails paralleling the log on opposite sides thereof, means for securing the base on the log, a pair of shoes slidable on the rails, posts fixed on said shoes, a frame, sleeves journaled on the frame and threadedly mounted on the posts for vertically adjustably mounting said frame thereon, a pair of pulleys mounted on the frame, a band-saw blade mounted on said pulleys and engageable with the log, a motor on the frame operatively connected to one of the pulleys for driving the blade, said base further including a pair of cross bars extending between the end portions of the rails, said securing means comprising screws threadedly mounted in said cross bars generally parallel to the axis of the log and engageable with the ends of the log and means on the base for securing boards on the log with the edges thereof uppermost to be removed by said band-saw.

4. A portable band-saw machine comprising, in combination, a base including means for mounting the base on a log to be sawed into boards, a carriage operable on the base, a band-saw on said carriage for cutting boards from the log, and means on the base for securing boards on the log with the edges thereof uppermost to be removed by said band-saw.

5. A portable band-saw machine comprising: a work support, a base removably mounted on said work support, said base including a pair of spaced rails paralleling the work support on opposite sides thereof, said base further including a pair of bars extending between the end portions of the rails, said bars having vertical openings therein, means on the base for securing boards on the work support with an edge thereof uppermost, said means comprising brackets including shafts engaged in the openings and further comprising plates fixed on said shaft and engageable with the end portions of the boards on one side thereof, clamps for securing the boards to the plates, and a band-saw slidable on the rails and engageable with the boards for removing the upper edge portions thereof.

6. A machine as defined in claim 4 wherein said band-saw includes two spaced pulleys, a band-saw blade mounted on said pulleys, a spindle rotatably supporting each pulley on said carriage, means adjustably connecting said spindles to said carriage including elongated slots in the carriage through which the spindles extend.

References Cited in the file of this patent

UNITED STATES PATENTS

| 1,238,436 | Reece | Aug. 28, 1917 |

FOREIGN PATENTS

| 8,316 | Sweden | Oct. 2, 1897 |
| 18,886 | Australia | Mar. 13, 1929 |
| 904,386 | France | Feb. 26, 1945 |
| 269,571 | Switzerland | Oct. 16, 1950 |
| 288,809 | Switzerland | June 1, 1953 |